United States Patent [19]

Harris

[11] Patent Number: 4,650,660

[45] Date of Patent: Mar. 17, 1987

[54] METHOD FOR FEEDING SOLIDS TO A CONTROLLED ENVIRONMENT

[75] Inventor: William G. Harris, Seattle, Wash.

[73] Assignee: The Boeing Company, Seattle, Wash.

[21] Appl. No.: 762,004

[22] Filed: Aug. 2, 1985

[51] Int. Cl.$^4$ .............................................. C01B 3/08
[52] U.S. Cl. ................................ 423/648 R; 141/4; 141/5; 141/7; 422/232
[58] Field of Search ................... 423/648 R; 422/232; 141/1, 4, 5, 7, 9, 99, 100

[56] References Cited

U.S. PATENT DOCUMENTS

| | | | |
|---|---|---|---|
| 1,565,249 | 12/1925 | Berry | 422/232 |
| 3,419,361 | 12/1968 | Bratton et al. | 423/648 R |
| 3,420,633 | 1/1969 | Lee | 423/648 R |
| 3,995,753 | 12/1976 | Millar et al. | 422/232 |
| 4,005,185 | 1/1977 | Ishizaka | 423/648 R |
| 4,064,226 | 12/1977 | Becker et al. | 422/232 |
| 4,211,537 | 7/1980 | Teitel | 423/648 R |
| 4,247,240 | 1/1981 | Schora, Jr. et al. | 422/232 |
| 4,401,402 | 8/1983 | Casperson | 422/232 |
| 4,543,246 | 9/1985 | Houser | 423/648 |

Primary Examiner—Andrew H. Metz
Assistant Examiner—Anthony McFarlane
Attorney, Agent, or Firm—John C. Hammar

[57] ABSTRACT

Metal particles are introduced to reactor beds in a hydrogen generator without introducing contaminating oxygen or nitrogen to the generator. The particles are protected against oxidation under an inert gas atmosphere, are flooded with water prior to injection into the generator, and are further flooded with hydrogen gas drawn from the generator to replace the water prior to injection.

15 Claims, 1 Drawing Figure

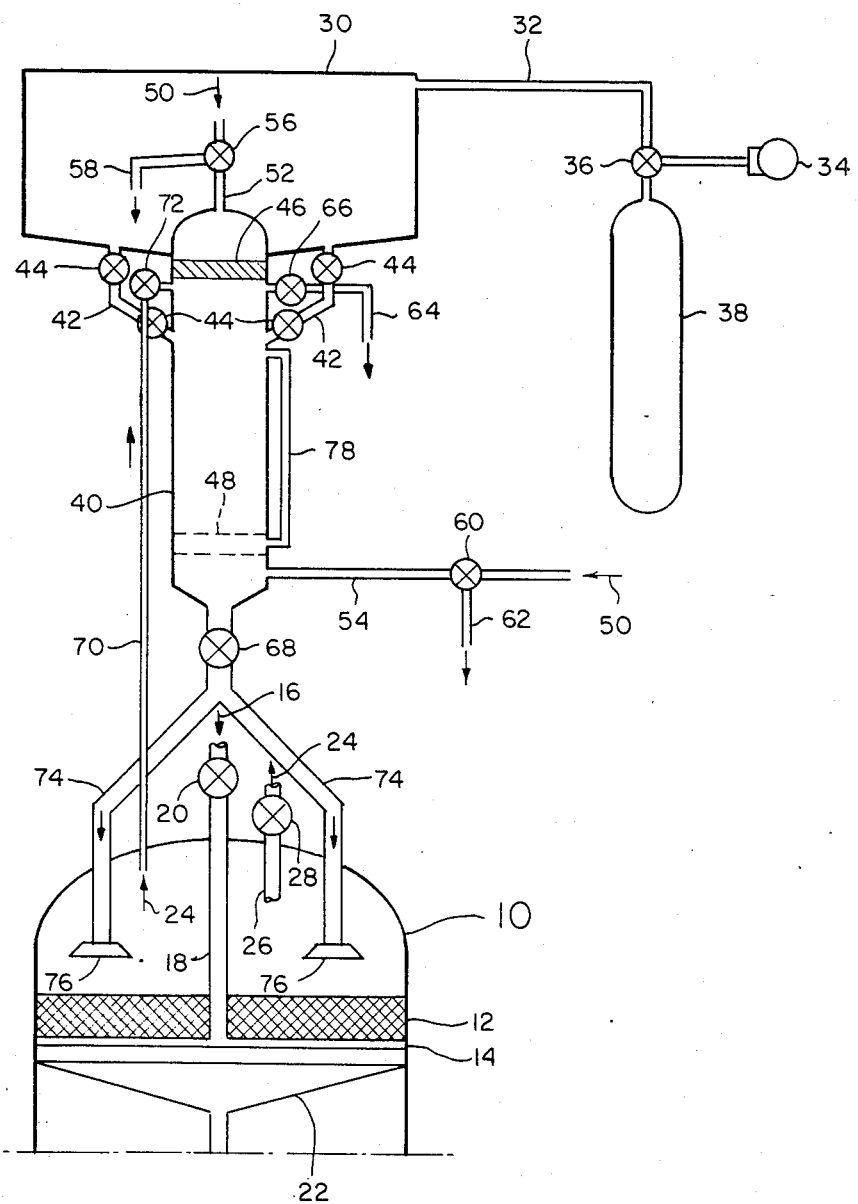

METHOD FOR FEEDING SOLIDS TO A CONTROLLED ENVIRONMENT

The United States Government has rights in this invention pursuant to Contract No. F04704-82-C-0038.

TECHNICAL FIELD

The present invention relates to a method for feeding solid metal particles to reactor beds of hydrogen generator without introducing oxygen, nitrogen, or other contaminants to the controlled environment of the generator.

BACKGROUND ART

When seeking to replenish reactor beds that are consumed in the creation of pure gases, a problem exists for introducing the metals needed in the beds into the controlled environment of the generator without introducing external contaminants into the generator. The problem is particularly acute with solid fuels that can be oxidized.

SUMMARY OF THE INVENTION

The method for feeding a solid fuel to a reactor of the present invention of reactive metal particles is especially adapted for use with a closed-cycle hydrogen gas generator that produces essentially pure hydrogen gas for use in a hydrogen-chorline fuel cell. The generator has a controlled environment tolerant of only small amounts of contaminants such as oxygen or nitrogen. Since metal reactants (also referred to as a solid fuel) are consumed by hydrochloric acid to generate the hydrogen gas, it is important to replenish the reactor beds of metal particles without introducing contaminants to the generator.

Metal particles in the method of the present invention are initially placed in a holding tank vented to the atmosphere. Air entrained within the particles is replaced with an inert gas, such as nitrogen, that is relatively insoluble in water and that is designed to prevent damaging oxidation of the particles during storage. Prior to introducing the particles into the reactor, the inert gas is replaced with water to avoid contamination of the generator with the gas. Since the reaction in the hydrogen generator involves the in-feed of dilute hydrochloric acid, any entrained water which is introduced with the particles will not prove damaging to the environment. Still, before introducing the particles to the generator, the water is generally replaced with a hydrogen-containing gas, preferably bled from the generator and introduced into the holding tank to drive the water from the tank. Only then are the particles injected into the generator. Injection is usually accomplished by moving a piston along the tank to force the particles through an outlet or connecting conduit between the tank and generator. After injection, the tank can be vented to the atmosphere to allow the addition of new particles to the tank for further processing.

Preferably, the tank is made in two sections; one, a receiving hopper that can be vented to the atmosphere, evacuated, and filled to a positive pressure with inert gas, and, two, an injector which may filled with water prior to transfer of the metal particles from the receiving hopper to the injector and which can subsequently be filled with hydrogen gas for driving the waste water from the tank to prepare the particles for injection into the generator. The second section is isolated from the atmosphere at all times, thereby reducing the probability of introducing contaminants to the generator.

These and other features of the method and apparatus will be more clearly understood by reference to the accompanying drawing and detailed description.

BRIEF DESCRIPTION OF THE DRAWING

The FIGURE is a detailed schematic of a preferred feed system of the present invention.

BEST MODE CONTEMPLATED FOR CARRYING OUT THE INVENTION

The solid fuel feed system of the present invention will be described with reference to a hydrogen generator, which is the contemplated use for this system. Those skilled in the art will recognize other applications for the system. In the preferred embodiment, the solid fuel is metal particles that are fed periodically to the hydrogen generator. The particles are consumed in the reactor to form waste heat and hydrogen gas.

A hydrogen generator 10 includes one or more reaction beds 12 of metal particles positioned on trays 14 within the generator 10. Dilute hydrochloric acid 16 is introduced to a reactor bed 12 through an in-feed line 18. Control of the feed is achieved with a valve 20 within the line 18. Hydrochloric acid flows through the reactor bed 12 and reacts with the pure metal particles to generate hydrogen gas and a solution of metal chlorides. The solution which emerges from the top of reactor bed 12 passes to a collector 22 and is directed to the next processing stage of the reactor or to a waste storage facility. Essentially pure hydrogen gas 24 is collected in a bonnet of the generator 10 and is drawn from the generator 10 through a product line 26 that includes a pressure regulating valve 28 to ensure that the pressure within the generator 10 is always above atmospheric.

The reaction of the acid on the metal particles depletes the bed so that, during continuous operation of the generator 10, additional metal particles must be added to the reaction beds 12. To ensure that the hydrogen product gas 24 is substantially pure and is suitable for use in a hydrogen-chlorine fuel cell, it is important that introduction of a new fuel be achieved without introducing oxygen, nitrogen, or other contaminants into the controlled environment of the generator 10.

The fuel feed system, accordingly, supplies the metal particles, which constitute the solid fuel, to the beds where the acid contacts the metal to produce hydrogen gas and a metal chloride salt solution in an exothermic reaction.

The preferred solid fuel feed system includes a receiving hopper 30 having an inlet (not shown) to allow introduction of a solid fuel, such as metal particles, into the receiving hopper 30 when the hopper is vented to the atmosphere. The hopper 30 is connected through a vacuum line 32 to a vacuum pump 34, which may be used to evacuate the hopper 30 to a pressure of about 1 psia or less, after introducing the metal particles (solid fuel) to the hopper. The vacuum line 32 is also connected through a two position valve 36 to a reservoir 38 of an inert gas, such as nitrogen. Following evacuation of the hopper 30, the vacuum pump is stopped, and the valve 36 is opened to allow a positive pressure of gas to enter the receiving hopper 30. This gas should be relatively insoluble in water and should be essentially nonreactive with the metal particles. The gas is used in the hopper to prevent any damaging oxidation of the metal particles while they are stored in the hopper prior to injection into the hydrogen generator 10.

The receiving hopper 30 is connected to an injector 40 with one or more conduits 42 that allow metal particles within the receiving hopper 30 to be fed by gravity or otherwise to the injector 40. Each conduit 42 preferably includes two or more valves 44 which can be closed to isolate the injector 40 from the receiving hopper 30. These valves 44 are particularly important to alleviate hydrogen leakage between the injector and the receiving hopper.

The injector 40 is generally cylindrical, and includes a teflon (KYNAR) piston 46 that can reciprocate within the injector 40 between the upper position shown in solid lines in the Figure and a lower position schematically illustrated by the dotted lines 48 in the Figure. The movement of the piston 46 is achieved by injecting water 58 behind the piston 46 through a port 52 at the top of the injector 40 or an exhaust port 54 near the bottom of the injector 40. A control valve 56 in the water infeed line above the port 52 allows the flow of water to be controlled and allows fluid to be diverted from the injector 40 through the port 52 to an exhaust line 58 to drain the injector 40 when the piston 46 moves from the lower position 48 to the upper position.

Similarly, a control valve 60 connected with the exhaust port 54 allows the water 50 to be shut-off and connection of the injector 40 to a waste line 62 for draining.

An overflow drain 64, including a flow control valve 66 is connected to the injector 40 above the connecting conduits 42 to allow draining of water 50 from the injector 40 when metal particles are transferred from the receiving hopper 30 to the injector 40. Entrained gas that is conveyed to the injector 40 from the receiving hopper by the particles is of a lower density than the water within the injector 40, rises to the top of the injector, and is bled from the injector through the drain 64. The metal particles, accordingly, displace water within the injector and form a mixture of the metal particles and water only.

A valve 68 at the bottom of the injector 40 isolates the injector from the generator 10, and allows the injector 40 to be filled with water 50 through line 54 prior to transfer of metal particles from the receiving hopper 30 to the injector 40, as has been described. With metal particles in the injector 40, the control valves 44 and 66 are closed, and hydrogen gas 24 flows into the injector from the generator 10 through line 70 by opening a control valve 72 in the line. The gas 24 enters the injector 40 near the upper end of the injector in the vicinity of the drain 64. With the valve 72 open, the control valve 60 is opened to allow the entering gas to drive the water with the particles in the injector 40 out of the waste line 62, leaving a combination of metal particles, hydrogen gas, and incidental entrained water within the injector 40. Then, the control valve 72 is closed and the valve 68 is opened. Water pressure is created behind piston 46 to drive the piston downwardly in the injector 40 and to force metal particles through fuel supply lines 74 into the generator 10. Distributor heads 76 rotate under the pressure of the metal particles in the supply lines 74 to distribute the particles uniformly over the bed 12.

A sight glass 78 on the side of the injector 40 allows the operator to know the level of liquid in the injector 40 by viewing the meniscus between the liquid and gaseous phases.

In summary, as the fuel feed method relates to feeding metal particles to a hydrogen generator, the metal particles are initially stored under an inert gas atmosphere to audio exidation of the metal, replacing the inert gas with water, and replacing the water with gas (essentialy pure hydrogen) bled from the generator. In this way, oxygen, nitrogen, and other contaminants do not enter the generator when the metal particles are injected.

While a preferred embodiment of the invention has been shown and described, those skilled in the art will readily recognize alterations, modifications, or variations that might be made to the preferred embodiment without departing from the inventive concept. The description and drawing are meant to illustrate the invention and not to limit it. The claims should be interpreted liberally in light of the description and drawing to protect the invention as described in the preferred embodiment and its full range of equivalents. The claims should only be limited as is necessary in view of the pertinent prior art.

I claim:

1. A method for introducing metal particles to a reaction bed in a hydrogen generator without introducing oxygen or nitrogen to the generator, comprising the steps of:
   (a) adding metal particles to a holding tank connected to the generator;
   (b) replacing air in at least that portion of the tank containing the particles with an inert gas; the inert gas preventing damaging oxidation of the particles;
   (c) replacing the inert gas with water to avoid contamination of the generator with the inert gas;
   (d) replacing the water with hydrogen; and
   (e) then, injecting the particles into the generator.

2. The method of claim 1 wherein the inert gas is nitrogen.

3. The method of claim 1 wherein the hydrogen is drawn from the generator to fill the tank.

4. The method of claim 1 wherein the particles are iron or zinc.

5. A method for introducing substantially pure metal particles to a hydrogen generator in which hydrogen is produced by the reaction of dilute acid with the particles, the method avoiding contamination of the generator with nitrogen or oxygen, comprising the steps of:
   (a) adding the particles to a holding tank connected to the generator;
   (b) replacing air in the particles with nitrogen to prevent oxidation of the particles during storage in the tank;
   (c) replacing the nitrogen in the particles with water to avoid contamination of the generator with nitrogen;
   (d) replacing the water in the particles with a hydrogen-containing gas drawn from the generator; and
   (e) injecting the particles into the generator.

6. The method of claim 5 wherein the tank includes two sections, a receiving hopper and an injector, and further comprising transferring particles from the receiving hopper to the injector to replace the nitrogen in the particles with water stored in the injector.

7. The method of claim 6 further comprising the steps of closing at least one valve between the hopper and injector to isolate the injector, and venting the tank to the atmosphere.

8. The method of claim 5 wherein replacing air with nitrogen includes the substep of evacuating air from the tank prior to introducing the nitrogen.

9. A method for introducing a solid to a controlled environment within a generator without contaminating the environment with oxygen or nitrogen, comprising the steps of:
   (a) adding the solid to a holding tank connected at one end of the controlled environment of the generator and vented at the other end to the atmosphere;
   (b) introducing an inert gas to the tank to replace air in the tank with the inert gas;
   (c) replacing the inert gas with a liquid in which the inert gas has a low solubility;
   (d) replacing the liquid with a second gas of substantially identical composition to gas within the generator; and
   (e) introducing the solid and second gas to the generator.

10. A method for feeding a solid to a reactor having a controlled environment without introducing external contaminants to the reactor, comprising the steps of:
   (a) introducing the solid to a hopper that is vented to the atmosphere;
   (b) closing the hopper;
   (c) evacuating the hopper;
   (d) introducing an inert gas to the evacuated hopper to create a positive pressure in the hopper;
   (e) transferring the solid from the hopper to a liquid filled injector having a drain port for draining excess liquid and gas in the injector, the liquid being of lower density that the solid;
   (f) introducing reactor gas from the reactor to the injector to expel the liquid from the solid through a drain port; and
   (g) injecting the solid and reactor gas into the reactor.

11. The method of claim 10 wherein the solid is a metal selected from the group consisting of iron and zinc.

12. The method of claim 10 wherein the inert gas is nitrogen.

13. The method of claim 10 wherein liquid is water.

14. The method of claim 13 wherein the step of injecting is achieved by moving a piston along the injector to force the solid into the reactor from the injector through an outlet.

15. A method for feeding metal particles to a hydrogen generator, comprising the steps of:
   (a) placing the particles in a hopper that is vented to the atmosphere;
   (b) closing the hopper;
   (c) evacuating the hopper;
   (d) introducing an inert gas to the evacuated hopper to create a positive pressure in the hopper;
   (e) tranferring the particles from the hopper to a liquid filled injector having a drain port for draining excess liquid and gas in the injector, the liquid having a lower density that than the particles;
   (f) introducing reactor gas from the generator to the injector to expel the liquid from the particles through the drain port; and
   (g) injecting the particles and reactor gas from the injector into the generator.

* * * * *